United States Patent
Baker (10) Patent No.: US 11,160,214 B2
(45) Date of Patent: Nov. 2, 2021

(54) BALE WRAPPING APPARATUS AND A METHOD FOR WRAPPING A BALE MADE FROM A CROP PRODUCT

(71) Applicant: Kverneland Group Ravenna S.R.L., Russi (IT)

(72) Inventor: Tim Baker, Shropshire (GB)

(73) Assignee: KVERNELAND GROUP RAVENNA S.R.L., Russi Ra (IT)

( * ) Notice: Subject to any disclaimer, the term of this patent is extended or adjusted under 35 U.S.C. 154(b) by 135 days.

(21) Appl. No.: 15/746,785

(22) PCT Filed: Jul. 28, 2016

(86) PCT No.: PCT/EP2016/068029
§ 371 (c)(1),
(2) Date: Jan. 22, 2018

(87) PCT Pub. No.: WO2017/017201
PCT Pub. Date: Feb. 2, 2017

(65) Prior Publication Data
US 2020/0281125 A1    Sep. 10, 2020

(30) Foreign Application Priority Data
Jul. 28, 2015 (EP) .................................. 15178648

(51) Int. Cl.
*A01F 15/00* (2006.01)
*A01F 15/07* (2006.01)

(52) U.S. Cl.
CPC ...... *A01F 15/071* (2013.01); *A01F 2015/073* (2013.01); *A01F 2015/076* (2013.01); *A01F 2015/0725* (2013.01)

(58) Field of Classification Search
CPC .... A01F 15/071; A01F 2015/076; A01F 3/00; B65B 2210/16; B65B 2210/18; B65B 11/025
See application file for complete search history.

(56) References Cited

U.S. PATENT DOCUMENTS 3,734,994 A * 5/1973 Blecha .................. B29C 55/065
  264/288.4
4,503,658 A * 3/1985 Mouser ................. B65B 11/045
  53/399

(Continued)

FOREIGN PATENT DOCUMENTS

| EP | 1310155 A1 | 5/2003 |
| EP | 1386532 A1 | 2/2004 |

(Continued)

OTHER PUBLICATIONS

Office Action issued in connection with Australian application No. 2016298636 dated Feb. 17, 2020.

*Primary Examiner* — Eyamindae C Jallow
(74) *Attorney, Agent, or Firm* — Steven M. Shape; Dennemeyer & Associates, LLC (57) ABSTRACT

The application discloses a bale wrapping apparatus (100), comprising a wrapping table with bale rotating means (112, 122) to hold, control and rotate a bale for the application of a wrapping material, and dispenser means (300) configured to dispense the wrapping material from rolls, and a dispenser means rotational support (116) configured to rotate the dispensed wrapping material around a uniform and/or non-uniform bale of material around a central rotating axis, and a wrapping control system configured to power, control, adjust and/or regulate the dispensed wrapping material through the dispenser means (300) to a predefined stretch ratio within acceleration and/or deceleration zones within one or more 360 degree rotations of the dispenser means (Continued)

rotational support (116). Furthermore, the application discloses a method for wrapping a bale (200) made from a crop product by a bale wrapping apparatus (100).

8 Claims, 5 Drawing Sheets

(56) References Cited

U.S. PATENT DOCUMENTS

| | | | | |
|---|---|---|---|---|
| 4,514,955 | A * | 5/1985 | Mouser | B65B 11/045 |
| | | | | 53/211 |
| 4,624,179 | A * | 11/1986 | Yves | A01F 15/141 |
| | | | | 100/13 |
| 4,953,336 | A * | 9/1990 | Lancaster, III | B65B 11/008 |
| | | | | 53/176 |
| 5,054,263 | A * | 10/1991 | Maki-Rahkola | B65B 11/04 |
| | | | | 53/399 |
| 5,822,967 | A | 10/1998 | Hood et al. | |
| 6,901,719 | B2 | 6/2005 | Viaud | |
| 6,928,796 | B2 | 8/2005 | Viaud | |
| 7,000,371 | B2 | 2/2006 | Viaud | |
| 8,230,663 | B2 | 7/2012 | Viaud | |
| 2003/0089081 | A1 * | 5/2003 | Platon | A01F 15/071 |
| | | | | 53/399 |
| 2007/0204564 | A1 * | 9/2007 | Lancaster, III | B65B 11/006 |
| | | | | 53/399 |
| 2009/0090603 | A1 * | 4/2009 | Ricciardi, Sr. | B65G 23/44 |
| | | | | 198/806 |
| 2009/0107102 | A1 * | 4/2009 | Biziorek | A01F 15/0883 |
| | | | | 56/341 |
| 2009/0178374 | A1 * | 7/2009 | Lancaster, III | B65B 57/04 |
| | | | | 53/441 |
| 2011/0131927 | A1 * | 6/2011 | Lancaster, III | B65B 57/00 |
| | | | | 53/461 |
| 2012/0067003 | A1 * | 3/2012 | Reijersen Van Buuren | |
| | | | | A01F 15/071 |
| | | | | 53/203 |
| 2016/0122053 | A1 * | 5/2016 | Zierden | B65B 45/00 |
| | | | | 53/556 |

FOREIGN PATENT DOCUMENTS

| | | |
|---|---|---|
| EP | 1438889 A1 | 7/2004 |
| EP | 1903851 A2 | 4/2008 |
| JP | H10117584 A | 5/1998 |

* cited by examiner

BALE WRAPPING APPARATUS AND A METHOD FOR WRAPPING A BALE MADE FROM A CROP PRODUCT

CROSS-REFERENCE TO RELATED APPLICTIONS

This is a 35 U.S.C. 371 National Stage Patent Application of International Application No. PCT/EP2016/068029, filed Jul. 28, 2016, which claims priority to European application no. 15178643.0, filed Jul. 28, 2015, each of which is hereby incorporated by reference in its entirety.

The present disclosure refers to a bale wrapping apparatus and a method for wrapping a bale made from a crop product.

BACKGROUND

Bale wrapping devices have been used extensively now for many years are mainly used to wrap bales of different types of crop mainly consisting of cylindrical shaped bales and rectangular shaped bales of various different sizes.

There are a number of different kinds of bale wrappers but two of the most common types are turntable and satellite/ring types.

Turntable wrappers rotate the bale on two axes around a stationary plastic dispenser unit. The turntable rotates on its central axis for a present number of revolutions.

Satellite wrappers rotate the plastic dispenser means around the bale that sits on the table and the table rotates the bale about its central axis to provide for the plastic overlapping as the satellites rotate the plastic dispensing means around the bale. For the purpose of this application, turntable and satellite wrapping devices have very similar wrapping characteristics but for reasons of clarity, comparisons to satellite type wrappers will be outlined for in the application and in particular reference to a wrapping apparatus described in a piece of prior art—WO 2013/063269 A2.

There are a number of issues with these current methods of wrapping.

Firstly, the dispenser means provides the stretch ratio via two rollers of similar size that are geared to a particular ratio to each other so as the plastic is pulled from the roll through the rollers at a predefined fixed ratio and the rotational motion of the dispenser means rotating around the bale of material pulls the plastic from the dispenser means rollers at the geared ratio between the two rollers. The rollers are not powered and are dependent on the circular motion of the dispenser means rotational support to draw the plastic from the rolls of film. This leads to the stretch ratio being above and below the recommended value due to the acceleration and deceleration zones around cylindrical or rectangular shaped bales; changes in wrapping material characteristics for example air temperature, variations in the rolls of wrapping material product and variations in the dispenser rotational speeds. The dispenser means applies the wrapping material to bales of cylindrical or rectangular shapes of various sizes and as the wrapping material is applied by the dispenser means at a fixed radius from the bales center, the rate at which the wrapping material is drawn from the dispenser means is accelerating and decelerating at particular zones around the circular path of rotation. The greater the rotational speed of the dispenser means around the bale, the greater the problem with the acceleration and deceleration of the wrapping material as it's applied to the bale. Also with uniform bales of material, the rotational speed of the wrapping device will have a negative influence on the stretch ratio of the wrapping material as the wrapping device increases in rotational speed due to the resistance from the wrapping material dispensing unit. Therefore, with current systems the speed and accuracy of the wrapping application is limited due to the limitations of the wrapping device.

Another disadvantage is if operators are operating the wrapping device to its limitations prior to the wrapping material breaking or being damaged, is the inconsistent wrapping material thicknesses and width of wrapping material at different locations on the bale of material due to the acceleration and deceleration zones. Basically, the manufacturer of the wrapping material issues guidelines on recommended wrapping material thicknesses and widths being applied to the bale.

Another disadvantage in relation to the varying ambient air temperatures is that at the upper or lower ends of the recommended temperature scale for applying wrapping material to bales is that the wrapping material may be overstretched due to the acceleration of the dispensing means at certain zones around the bale and as a result the wrapping material may surpass its elastic state and enter a plastic state. If the wrapping material enters a plastic state and is applied to the bale, the ability or properties of the wrapping material to try and contract have been diminished and therefore the bale of material will not be as effectively packaged and this will affect the quality of the end product after the fermentation period.

A further disadvantage of the overstretching of the wrapping material due to the periodical acceleration of wrapping material dispensing of the dispenser means is that the width of the wrapping material may reduce to a dimension under the recommended value assigned by the wrapping material manufacturer and as a result the overlapping of the wrapping material on the bale of material could be less than the recommended value and as a result this would affect the air tightness of the wrapped bale and thereafter the quality of the end product.

Another disadvantage is in the vast majority of wrapping machines used today, the wrapping material is drawn off the roll through rollers by rotating the dispenser unit around the bale, so the dispenser unit is not powered and the stretch is achieved by a gearing of rollers to a ratio and pressing the rollers onto the roll of wrapping material in order to achieve the predefined ratio which is an unreliable method due to wrapping bales of material of non-uniform shapes and as a result acceleration and deceleration zones are created.

There have been proposals in the area of powering the wrapping material dispenser rollers to provide a more consistent stretch, higher stretching ratios and also increase the wrapping speeds but they are limited regarding the consistency and control regarding the stretch in relation to the geometry of the cylindrical or rectangular shaped bales. It does not take into account the acceleration and deceleration zones.

One such piece of prior art is application U.S. Pat. No. 6,253,532. It applies wrapping material via a satellite type wrapping means with a table of two rollers rotating the bale about its central axis to provide the timing of rotation of the satellite wrapping means and the table rollers so the wrapping material is overlapped to seal the bale of material. Also the wrapping dispenser rollers are powered (driven) by a hydraulic type device to dispense wrapping material off the roll and these powered wrapping dispenser rollers are driven by a hydraulic motor connected in series to the hydraulic motor responsible for the rotation of the satellites. It increases the stretch ratio of the plastic and can speed up the plastic dispensing means rotation. But it is limited due to the fact the powered stretch rollers speeds are directly proportional to the rotational speed of the wrapping devices arms or table. In other words there is a linear relationship (two dimensional) between the speed of the power stretching rollers and the rotational speed of the dispenser means arms or table and it does not take into account the non-uniform nature of applying a plastic material to a non-circular shaped object such as applying the plastic material around ends and circumference of a cylinder or a rectangle which involves acceleration and deceleration zones within one revolution of the wrapping material dispensing means arms, table or ring type devices.

U.S. Pat. Nos. 5,979,146 and 5,816,026 are from the same family but all have the same limitations regarding the acceleration and deceleration zones within each revolution of the wrapping devices wrapping means.

SUMMARY

It is an object to provide an improved bale wrapping apparatus and an improved method for wrapping a bale made from a crop product.

Specifically, the limitations offered by the aforementioned prior art regarding the acceleration and deceleration zones of each revolution shall be solved when wrapping a non-uniform shape such as a cylinder or rectangle.

According to an aspect, a bale wrapping apparatus is provided. The bale wrapping apparatus comprises a wrapping table, and wrapping control system. The wrapping table is comprising a bale rotating device configured to support and rotate a bale made from a crop material for the application of a wrapping material; a material dispenser configured to dispense the wrapping material; and a material dispenser rotational support configured to rotate the wrapping material dispensed around a central rotating axis. The wrapping control system is comprising a first sensor component configured to sense first signals indicating rotational position and rotational speed for the material dispenser rotational support; a second sensor component configured to sense second signals indicating rotational speed for the material dispenser; and a controller. The controller is configured to receive the first and second signals; generate, in response to processing at least one of the first and second signals, first control signals; and provide the first control signals to at least one of the material dispenser for controlling a dispensing rate of the wrapping material, and the material dispenser rotational support for controlling rotation of the material dispenser rotational support.

According to another aspect, a method for wrapping a bale made from a crop product by a bale wrapping apparatus is provided. The method is comprising: receiving a bale of crop on a wrapping table; supporting and rotating the bale by a bale rotating device for applying a wrapping material to the bale; dispensing the wrapping material by a material dispenser; rotating the wrapping material dispensed around a central rotating axis by a material dispenser rotational support; and controlling the wrapping of the wrapping material by a wrapping control system. The controlling is comprising sensing, by a first sensor component, first signals indicating rotational position and rotational speed for the material dispenser rotational support; sensing, by a second sensor component, second signals indicating rotational speed for the material dispenser; and operating a controller. The operating of the controller is comprising: receiving the first and second signals; generating, in response to processing at least one of the first and second signals, first control signals; and providing the first control signals to at least one of the material dispenser for controlling a dispensing rate of the wrapping material, and the material dispenser rotational support for controlling rotation of the material dispenser rotational support.

The wrapping apparatus may be provided in a combined bale forming and wrapping device. As an alternative the wrapping apparatus may be provided as a standalone wrapper or wrapping machine.

The sensing of the first signals may comprise sensing first rotational position signals and first rotational speed signals for the material dispenser rotational support. With regard to the first signals indicating the rotational position, a position along a 360 degree path may be indicated, e.g. an angle position.

The material dispenser may comprise material dispenser rollers configured to dispense the wrapping material.

With the bale wrapping apparatus the following may be provided: The material dispenser rollers may be connected to a dispenser rollers drive having a gear; and the gear may be configured, in response to the first control signals, to provide a geared ratio of rotational speed for rollers of the material dispenser rollers to the dispenser rollers drive. The providing the geared ratio may comprise providing a rotational speed difference for the rollers.

For the bale wrapping apparatus the following may be provided: The bale rotating device may comprise bale rotating rollers; and the wrapping control system may further comprise third sensor component configured to sense third signals indicating rotational speed of the bale rotating roller. The controller may be further configured to receive the third signals; generate, in response to processing at least one of the first, second and third signals, second control signals; and provide the second control signals, for controlling rotation of the bale rotating rollers, to the bale rotating device. The bale rotating rollers may be driven by one or more motors. There may be further control signals generated by the controller in response to processing at least one of the first, second and third signals. In an alternative embodiment, the generating of the first control signals may comprise processing the third signals, without having the second control signals generated.

The wrapping control system may further comprise a fourth sensor component configured to sense fourth signals indicating an end and a start of a 360 degree path of rotation of the material dispenser rotational support. The generating of the first and/or second control signals may comprise processing the fourth signals.

The wrapping control system may further comprise a fifth sensor component configured to sense fifth signals indicating an ejection of the bale to the wrapping table. The generating of the first and/or second control signals may comprise processing the fifth signals.

The controller may be further configured to implement, in response to processing at least one of the first, second, third and fourth signals, a first mode of operation in acceleration zone and a second mode of operation in a deceleration zone around the 360 degree path of rotation of the material dispenser rotational support, at least one of the first and second control signals being different for the acceleration zone and the deceleration zone. With regard to the acceleration zone and the deceleration zone, the first or the second control signals or both control signals may be different. Due to a non-uniform bale shape, the dispenser means carried by the dispenser means rotational support may be passing through different zones including one or more acceleration zones and one or more deceleration, zones around the 360 degree path of rotation of the material dispenser rotational support. Positional information as to a present zone passed may be derived from the rotational position of the material dispenser rotational support.

With regard to the method, the following may be provided: wrapping a bale having a non-uniform shape, controlling a stretch ratio for the dispensing of the wrapping material, and dispensing the wrapping material with a consistent stretch ratio. The stretch ration may be kept consistent through the plurality of zones passed the 360 degree path of rotation of the material dispenser rotational support. Thereby, a consistent compacting pressure may be applied to the bale of crop material.

Following, further aspects of at least one of the wrapping apparatus and the method for wrapping a bale made from a crop material are disclosed.

A uniform shape for the purpose of the present disclosure could be described as the circumference of a cylinder for example and as the wrapping dispenser means which may also be referred to as material dispenser rotates at a set radius around the circumference of the object, the length of plastic in tangent to the objects circumference and in tangent to the plastic dispenser units roller, therefore the length of material would always be equal for the 360 degree rotational journey, thus not creating any acceleration or deceleration zones.

Three dimensional control for the present disclosure may relate to the relationship of three or more variables comprising two pieces of information (e.g. rotational speed and position) from the material dispenser rotational support and one piece of information (e.g. rotational speed) from the material dispenser being collected, and the three pieces of information are used for the computation or processing to regulate, by generating control signals, the rotational speed of the material dispenser which may equate to a nonlinear relationship between the dispenser means rotational support and the dispenser means in a 360 degree rotational journey.

There may be provided a wrapping table with bale rotating means to hold, control and/or rotate the bale for the application of wrapping material, dispenser means to dispense the wrapping material from the rolls and a dispenser means rotational support to rotate the dispensed wrapping material around a uniform and or non-uniform bale of material around a central rotating axis, followed by a system to control, adjust and regulate the dispensed wrapping material through the dispenser means to a predefined stretch ratio within acceleration and or deceleration zones within one or more 360 degree rotations of the dispenser means rotational support.

There may be provided a system and/or a method to obtain signalled information from the wrapping machine or apparatus, a calculating process to translate the information through formulation and a means for this formulated information to influence the devices on the wrapping machine to control, correct and maintain a consistent stretch ratio to the applying plastic material at high wrapping speeds through zones of acceleration, deceleration around bales of material with a non-uniform shape for dispensing wrapping material. It may comprise a varying powered plastic dispenser means with signal detection means to detect its rotational speed, acceleration and deceleration, dispenser means rotating around the central axis of the dispenser means rotational support, a signal detection means to detect rotational speed and simultaneously detect the angle of the dispenser means support in relation to a home position on every given 360 degree rotational cycle, a table with means to provide rotation to the bale of material and a signal detection means to detect rotational speed of the rollers.

Wrapping material may be dispensed by providing intermittent power to the dispenser means to a predefined stretch ratio provided on the dispenser means and rotated around the bale of material by the dispenser means rotational support, the bale is rotated about its central axis by a table with rotating means. Intermittent power may be provided by an electric motor, a mechanical drive or a braked device which is configured to intermittently brake (stretch) the wrapping material (e.g. plastic material) at constant or different stretch percentages through acceleration and deceleration zones. There may be means to provide varying rotational movement to the dispenser means device, the dispenser means support, and/or the table rotating means. Means may be provided to provide a predefined percentage of powered drive or to provide a predefined braking effect required for a percentage of the rotational movement of the preselected ratio of the dispenser means and the remaining percentage coming from the dispenser means rotational support pulling the plastic material from the roll through the geared ratio dispensing means.

There may be a calculating or processing process which is applied to provide simultaneous calculation from the signals received from sensing components for the plastic dispenser means, the dispenser means rotational support, and/or the table with bale rotating means. A further calculating process may be applied to provide for the rotational speed and positional information from the dispenser means rotational support for the varying of the rotational speed of the dispenser means in relation to position and speed of the dispenser means rotational support to the three dimensional relationship of the dispenser means and the dispenser means rotating support to provide a consistent stretch ratio at high rotational speeds through acceleration and deceleration zones around a non-uniform bale of material.

The stretch ratio may define a length by which the material is stretched (extended) along one or more dimensions compared to a non-stretched state of the material. For example, a plastic material may be stretched.

A desired stretch ratio can be provided by a powered braking effect, an unpowered varying frictional braking effect, an unpowered mechanical influence on the stretch ratio and/or a powered mechanical influence on the stretch ratio within the acceleration and deceleration zones.

Consistent control of the ratio of stretch may be provided by the osculating powering of the dispenser means rotational speed defined by a preselected percentage of the rotational movement of the preselected ratio of the dispenser means and the remaining percentage of rotation deriving from the dispenser means rotational support pulling the plastic material from the roll through the geared ratio dispensing means passing the acceleration and deceleration zones around the 360 degree rotational path of the dispenser means rotational support while simultaneously obtaining signalled information from the dispenser means and dispenser means support, calculating to translate the information through formulation and this formulated information influencing the devices on the wrapping machine to control, correct and maintain the varying rotational speeds of the dispenser means and dispenser means support to achieve a consistent stretch ratio for applying plastic material at high wrapping speeds through zones of acceleration, deceleration around bales of material with a non-uniform shape for dispensing wrapping material.

Wrapping of non-uniform bales of material may result in the dispenser means passing through an acceleration zone followed by a deceleration zone. An acceleration zone may be defined by when the wrapping material comes into contact with the corner of a bale of material. The distance from the side of the bale to the arc will increase until a maximum dimension is reached measuring from the side of the bale to the dispenser means. Following, this maximum dimension from the side of the bale to the arc, the deceleration zone begins with a dimension from the side of the bale to the arc decreasing until a dimension of zero is reached marking the end of the deceleration cycle and thereafter an alternating sequence will exist between acceleration and deceleration zones.

The acceleration zones may involve the dispenser means rotating on an arc moving in a general direction away from the last corner of the bale of material that the wrapping material has made contact with. Deceleration zones involves the dispenser means rotating on an arc moving in a general direction towards the next corner of the bale of material that the wrapping material will make contact with.

The system may receive signals from the dispenser means rotational support and monitors its speed and position and from the speed and positional signals, the system formulates and calculates the required speed at a defined location of the dispenser means rotational support to provide a powering of the dispenser means to provide the predefined stretch ratio of the wrapping material and the system further monitors multiples of signals received in a time providing ongoing formulation and calculation resulting in corrections to the dispenser means speed through the acceleration and deceleration zones resulting in a osculation of the speed of the dispenser means powering means around a 360 degree rotation.

Each 360 degree rotation of the dispenser means rotational support and formulation and calculation of the three dimensional relationship of variables may be unique.

The rotational speed provided by the powering means of the dispenser means may be a selectable percentage less than the actual rotational speed created by and linked directly to the rotational speed of the dispenser means support responsible for the pulling of the wrapping material through the dispenser means at a given linear speed linked directly to the rotational speed of the dispenser means rotational support.

The processes can be grouped into two distinct areas of control with the dispenser means rotational supports commonly linked to both areas, firstly the dispenser means rotational supports rotation speed is linked and controlled simultaneously with the rotational speed of the table with bale rotating means while secondly the dispenser means rotation speed is directly linked to the dispenser means support rotation speed and position within a 360 degree rotation cycle.

The system may monitor the speed and position of the dispenser means rotational support, send the value of the speed and position of the dispenser means rotation support for computation, and send the calculated level of power to the dispenser means rotating device to achieve the correct value of rotation for the dispenser means at a particular location and speed of the dispenser means rotational support. The dispensing speed may be readjusted in multiples on every 360 degree path of rotation through one or more zones of acceleration and deceleration to achieve a predefined wrapping material stretch ratio.

The computing process may monitor, alter and/or regulate the speeds of the dispenser means, dispenser means rotational support and the table with bale rotating means, in particular the speed and positional signals received from the dispenser means support and the speed signals from the dispenser means to formulate a three-dimensional control within a 360 degree path of rotation.

The method and processes may comprise controlling the powered rotation of the dispenser means to the dispenser means geared ratio between its two rollers. The powering of the rotation of the dispenser means may be of a pulsating type defined by acceleration and deceleration zones to each 360 degree path of rotation and may be further defined by that each 360 degree cycle of rotation with varying osculating powering and rotational speed of the dispenser means being unique to each and every 360 degree path of rotations.

The defining variables linking the dispenser means rotational speed and the positional and rotational speed of the dispenser means rotational supports may be processed to give three-dimensional control to applying the plastic type material to the bale of any shape.

Three-dimensional control may relate to the relationship of three variables consisting of two pieces of information from the dispenser means rotational support and one piece of information from the dispenser means being collected and the three pieces of information are used for the computation to regulate the rotational speeds of the dispenser means which equates to a non-linear relationship between the movement of the dispenser means rotational support and the dispenser means.

The signalled information may be collected from the dispenser means, dispenser means support and table with bale rotating means. A linear relationship may exist between the signals from the dispenser means and signals from the table with bale rotating means, the increase in signals received from the dispenser means support, the faster the table with bale rotating means needs to rotate and a computation process will be ongoing to regulate the rotations of each, in addition to this linear relationship, the dispenser means and the dispenser means support develop a three-dimensional relationship. A nonlinear relationship exists, as the signalled information received from the dispenser means support consists of positional and speed type information and the signalled information received from the dispenser means is related to the speed of the dispenser means and collectively the signalled information is computed and processed to 1. control and regulate the speed of the dispenser means in relation to the dispenser means support rotational speed, and 2. control and regulate the acceleration, deceleration of the dispenser means drive means at various positions around a 360 degree rotational journey within designated acceleration and deceleration zones The wrapping material stretch ratio may be controlled and regulated by signalled information received from the dispenser means and the dispenser means support defined by positional and speed information from the dispenser means support and speed information from the dispenser means.

The method of the calculation processes and regulation may be defined, the speed of the dispenser means rotational support is obtained from receiving signalled information from the teeth of a slew ring type device, the system processes the signalled information and calculates an R.P.M. (revolutions/minute) value based on the number of signalled pulses/time value. The position of the dispenser means rotational support acceleration and deceleration zones may be calculated using the number of signalled pulses after a zero state position, a number of signal pulses counted after the zero state position defining each acceleration and deceleration zones in a 360 degree rotation. The speed of the dispenser means can be defined also by a signal pulse type. Through a method of formulation or processing, a predefined speed may be assigned to the dispenser means through the acceleration and deceleration zones for a given dispenser means rotational support R.P.M therefore providing for a predefined consistent stretch ratio for the wrapping material.

In another embodiment, predefined values for the dispenser means and the speed of the dispenser means rotational support at every degree of rotation for each 360 degrees can be provided. In effect, the values (e.g. speed) are known to the processor/computer/software before the dispenser means and the dispenser means rotational support reach every degree of rotation in the future.

The controlling processor may react to control and alter and maintain speeds of the dispenser means rollers in tandem to the rotating speed and position of the dispenser means rotational support arms.

The varying speed of the dispenser means may be directly linked to both the speed and position of the dispenser means arms.

Electric motors may be used to provide varying power and torque to the dispenser means. The electric motors will be provided with varying levels of power relating directly to the position and speed of the dispenser means arms.

A predefined percentage of the rotation of the dispenser means rollers may be provided by the electric motors while the remaining rotation is by the dispenser means arms rotating around the bale of material and pulling the plastic through a predefined geared ratio.

The powering means may be required to provide a boost of power to the rollers in the acceleration zones and provide no power to the rollers in the deceleration zones around the bale.

It may relate to the dispenser means requiring power only for a predefined zone within the acceleration zone to provide the necessary control of the stretch ratio of the wrapping material.

The dispenser means rotational support speed and position may be monitored by the system and a calculating process is carried out to determine the predefined speed required at that particular position and speed of the dispenser means support, the system calculates and communicates back to the controlling unit to provide a level of power to the device on the dispenser means to provide the required level of rotational speed to the dispenser means.

The percentage of rotational speed by the powering device for the dispenser means rollers may be user defined on the operating user interface and preselected.

The powering of the dispenser means can be selected for one of the acceleration and deceleration zones defined by one of the acceleration and deceleration zones not receiving any powered rotation for the dispenser means.

One aspect defining the acceleration and deceleration zones, when the wrapping material makes contact with the corner of the non-uniform bale of material, for angle X as the dispenser means rotational support rotates along an increasing arc away from the corner of the bale of material, the wrapping material accelerates of the roll until the increasing arc from the corner of the bale reaches the outer most point, next the arc of travel for the dispenser rotational support starts to decrease in relation to a perpendicular distance to the bale of material up to a perpendicular distance of zero and this angle Y of rotation denotes the deceleration zone.

A mechanical device may regulate the dispenser means by releasing the tension at critical moments in each of the acceleration zones on the 360 degree path of rotation.

There may be provided a dispenser means and dispenser means arms rotational support for dispensing plastic around a non uniform bale of material. The dispenser means provides stretch by a ratio between rollers and a spring compressing the rollers against the roll of wrapping material provides friction for the geared rollers to provide the stretch. Preferable a linkage system is connected back to the center of the dispenser means rotational support and a cam type mechanism at selected positions around the 360 degree journey of rotation within the acceleration and or deceleration zones push on the linkage to release the compression on the wrapping material of the dispenser means rollers at predefined peak acceleration and or deceleration zones to achieve a consistent predefined stretch ratio.

The linkage and cam system may be adjustable to refine and adjust the level of the compression on the wrapping material by the dispenser means rollers.

The linkage system may be adjusted to disable the function of releasing the compression on the wrapping material by the dispenser means rollers so wrapping could continue as standard without any influence on stretch within acceleration and or deceleration zones.

There may be many advantages over the current prior art and wrapping systems in everyday use at the moment.

The wrapping of non-uniform bales of material with a wrapping material may leads to zones of acceleration and deceleration around the 360 degree rotational journey of the wrapping material and there may be means to control, alter and maintain a consistent stretch ratio of the wrapping material through the acceleration and deceleration zones and as a result the wrapping material will have a correct thickness when stretched and applied to the bale of material, the wrapping material will have a correct stretched width dimension when applied to the bale of material. When air and wrapping material temperatures are above and or below the normal, it can regulate the stretching in the various acceleration and or deceleration zones to compensate for the changing wrapping material characteristics and therefore the wrapping material will be applied at the correct stretch ratio and thickness given any type of wrapping material characteristics.

It may ensure the wrapping material will be applied to the predefined and correct stretch ratio and as a result the wrapping material will not enter an overstretched plastic state resulting in the wrapping material using its elastic properties to contract and seal the bale of material for the fermentation process.

The system can automatically adjust to varying characteristics of wrapping material to apply the wrapping material to the correct ratio on all areas of a non-uniform or and a uniform bale, It may also allow the wrapping device to increase significantly in rotational speed without the risk of the wrapping material becoming overstretched or damaged for any given wrapping material characteristics.

DESCRIPTION OF FURTHER EMBODIMENTS

Following, further aspects are disclosed by referring to Figures. In the figures show.

Referring now to FIGS. 1 to 4, a wrapping machine or apparatus 100 is shown. A wrapping machine having similar construction features as such is disclosed in WO 2014/001330 A2.

Typically, this wrapping machine 100 may be of the standalone type or in combination with a baler. Cylindrical bales of material may be wrapped with the machine. Also, rectangular bales or square bales can be wrapped with the machine.

Figure 1:
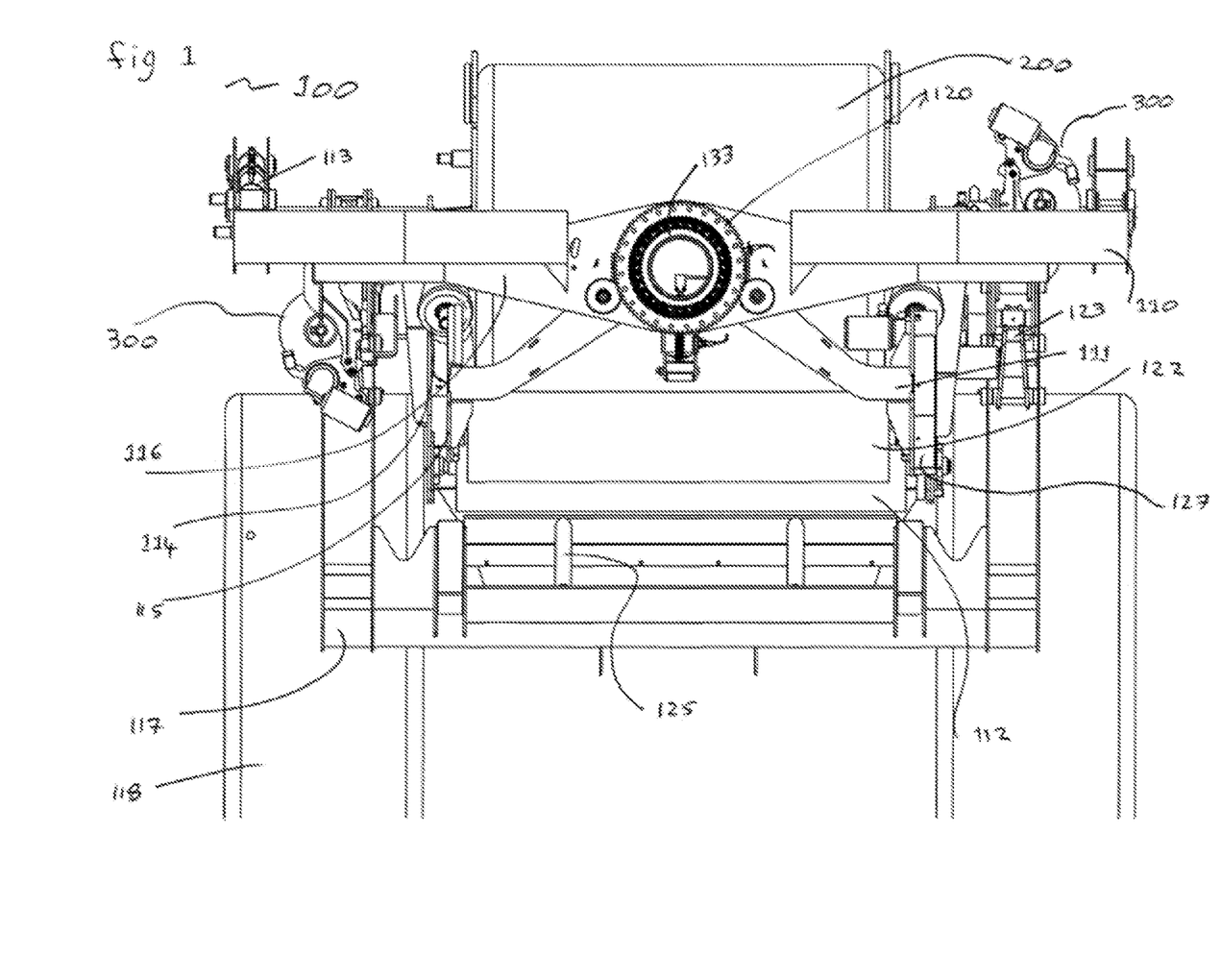
FIG. 1 a sectional view from behind a wrapping machine or apparatus with a wrapping material dispensing rotational support in a home or horizontal position.

Referring now to FIG. 1, a main structure of the wrapping machine or apparatus 100 is illustrated and labelled. A sectional view from the back of the wrapping machine 100 cuts through part of an external frame 110 and illustrates wrapping machines components.

The frame 110 runs to the sides and to the back of the wrapping machine supporting a slew ring bearing 120 in its center. The frame 110 may also be referred to as main frame or external frame. The slew ring bearing 120 is bolted to the frame 110. The slew ring bearing 120 bolts a dispenser means rotational support 116. Running through the center of the slew ring bearing 120 is a center support tube 133 which is bolted onto the main frame 110. At the other end of the center support tube 133 a supporting frame 111. The supporting frame 110 carries a back table roller 122 of the wrapping machine 100, the back table roller 122 may also be referred to as back table rotating roller. Bale guide rollers are also attached to the supporting frame 111 to ensure a bale 200 (see FIG. 4) is guided onto the center of the wrapping machine 100.

The wrap around the frame 110 is pivotally moveable up and down and is power by a hydraulic cylinder 113 for the releasing of a wrapped bale. At the front of the wrapping machine, a frame 127 on the left and right sides supports a further table rotating roller 112 and its these two rollers that are used to support and control the bale 200 turning motion on its central axis. In this particular embodiment the wrapping machine is combined with a nonstop baler. The bale 200 is released by gravity onto a bale ramp 125 over the table rotating roller 112 and finally comes to rest on the back table rotating roller 122.

Figure 1A:
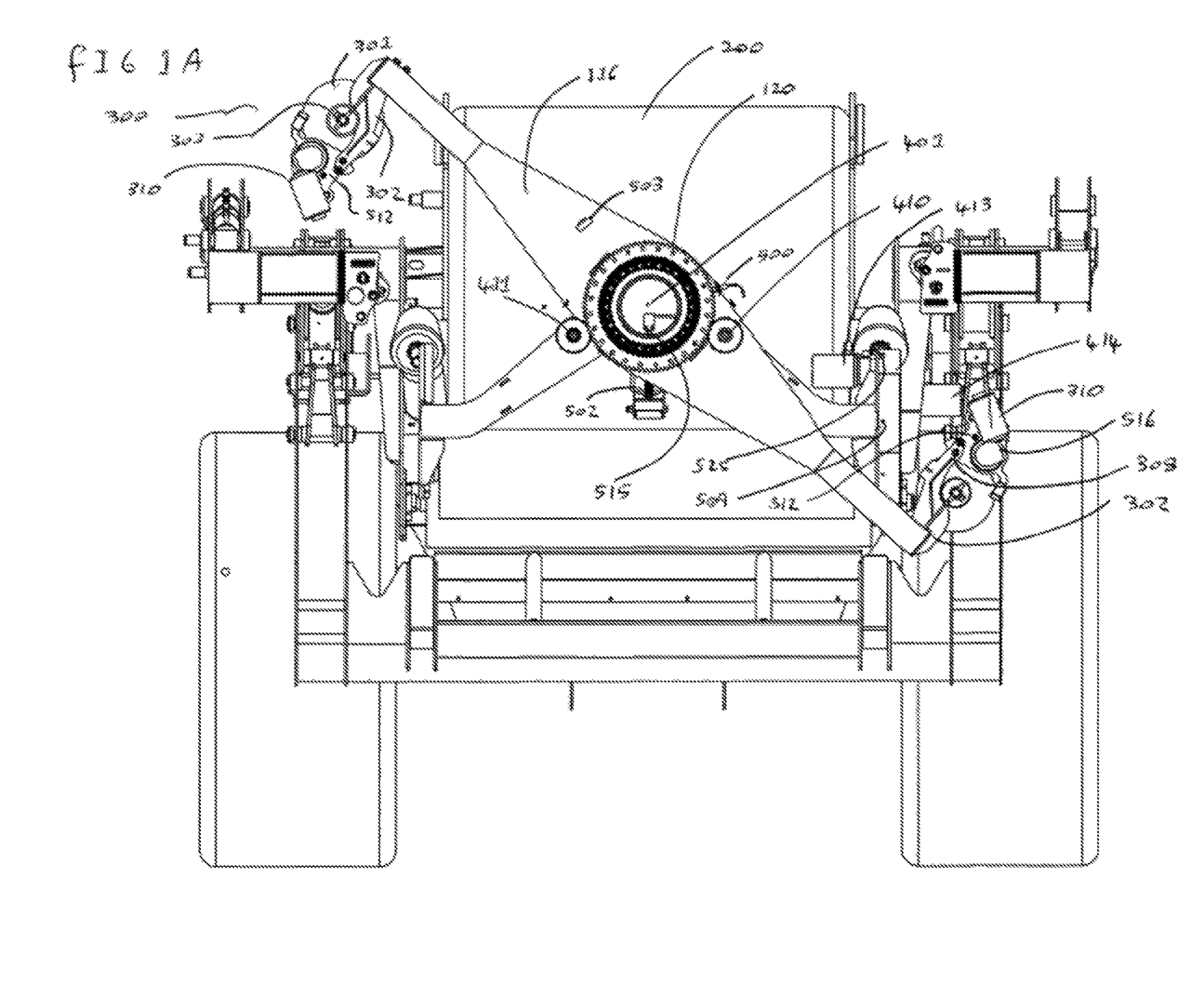
FIG. 1A a sectional view from behind the wrapping machine with the wrapping material dispensing rotational support in a working position demonstrating dispenser means and the dispenser means rotational support in one of the acceleration or deceleration zones.

FIG. 1A illustrates a wrapping material dispenser means, signal controls and dispenser means, dispenser means rotational support 116 and table of bale rotating means drive means.

The general dispenser means is denoted by the number 300. Dispenser means support 302 attaches the dispenser means unit 300 onto the dispenser means rotational support 116. Centre pivoting point 303 holds a roll of wrapping material for dispensing through rollers 325 and 326. The speed of the rollers 325, 326 are controlled and altered by a drive means 310. In this case the drive means 310 is an electric motor, but the drive means may be anyone of electric, hydraulic, mechanical etc. The gearing or ratio between the two rollers 325, 326, of the dispenser means is controlled by gears 320 and 321.

The dispenser means rotational support 116 is controlled and driven by a motor 410 and slowed down and braked by a brake device 411. The table rotating rollers 112 and 122 are driven by motors 413 and 414. The drive means for these components may be of hydraulic, electrically or of mechanical means.

Control for formulation and processing may come from components as follows. Component 500 which may also be referred to as first sensor component is of a sensor type and collects signals to determine the rotational speed and position of the dispenser means rotational support. Component 512 which may also be referred to as second sensor component collects signals to calculate the rotational speed of the dispenser means rollers. Component 525 which may also be referred to as third sensor component collects signals to calculate the rotational speed of the table with bale 200 rotating means to control the rotational speed of the roller and therefore the bale 200 of crop material. Component 503 which may also be referred to as fourth sensor component signifies the end of a 360 degree rotation and the start of the next 360 degree rotational journey. Apparatus 502 which may also be referred to as fifth sensor component complete with signal detection means signifies to the system when the bale 200 has been ejected from the baling apparatus onto the wrapping apparatus 100.

Figure 2:
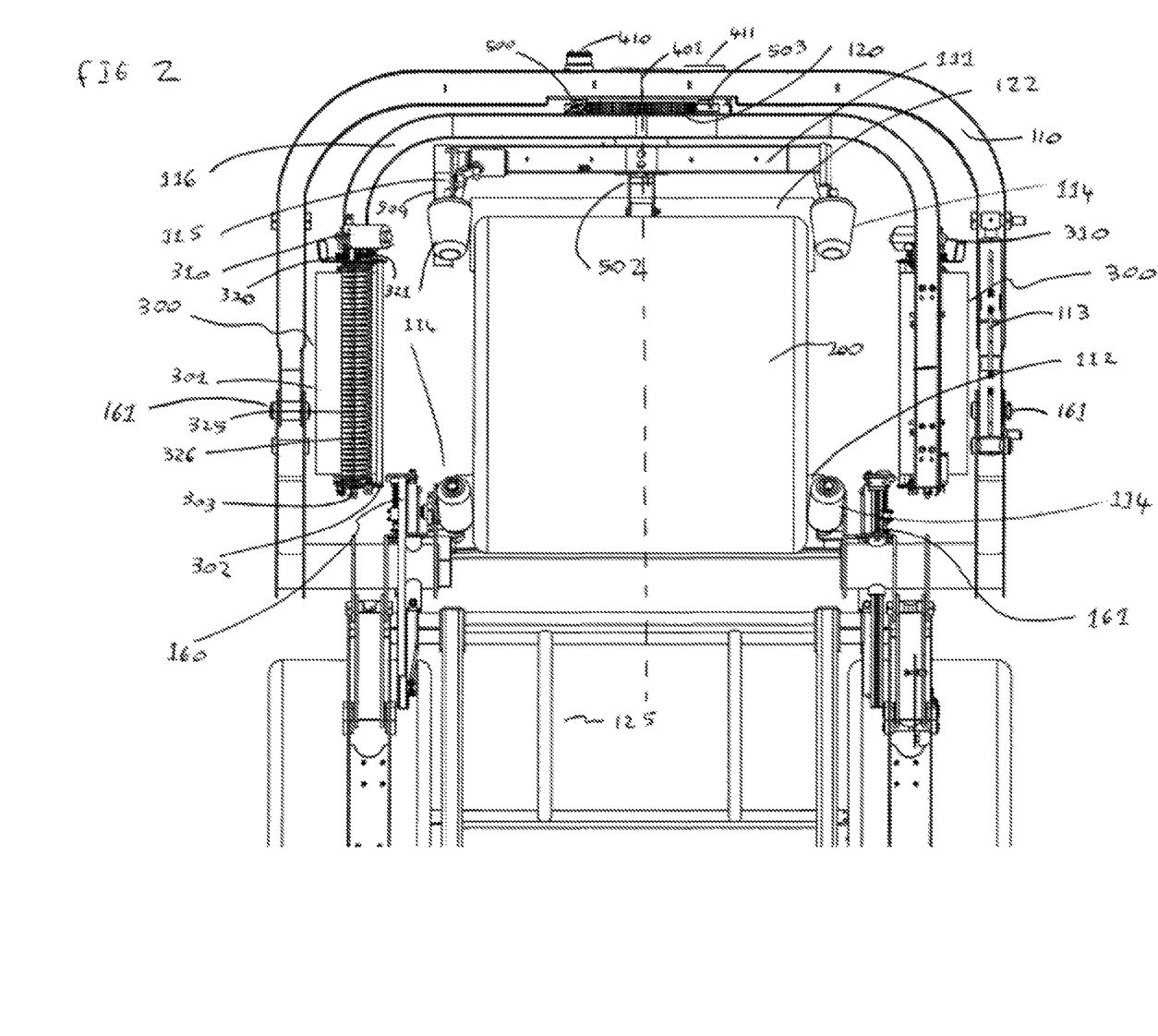
FIG. 2 a plan view of the wrapping machine or apparatus.

FIG. 2 illustrates the wrapping apparatus 100 in a plan view which again all the important components are noted. The frame 110 pivots from pivot points 161 each side and around the back of the wrapper and is pivoted upwards by actuating means 113 to realise the bale 200 wrapped with material. Bale rotating rollers 112 and 122 rotate the bale 200 of material. Plan view shows in this embodiment two wrapping material dispenser units 300. Rollers 325 and 326 rotate, control and alter the stretch and dispensing rate of the wrapping material. Control of the rollers 325 and 326 is by a drive means 310 and signal control is by component 512. Gears 320 and 321 provide a rotational speed difference between the two rollers to provide a stretch ratio. Cut and hold units 160 on the left and right sides are responsible for cutting the plastic at the end of each wrapping cycle and holding or clamping the plastic for the start of the next wrapping cycle.

Figure 3:
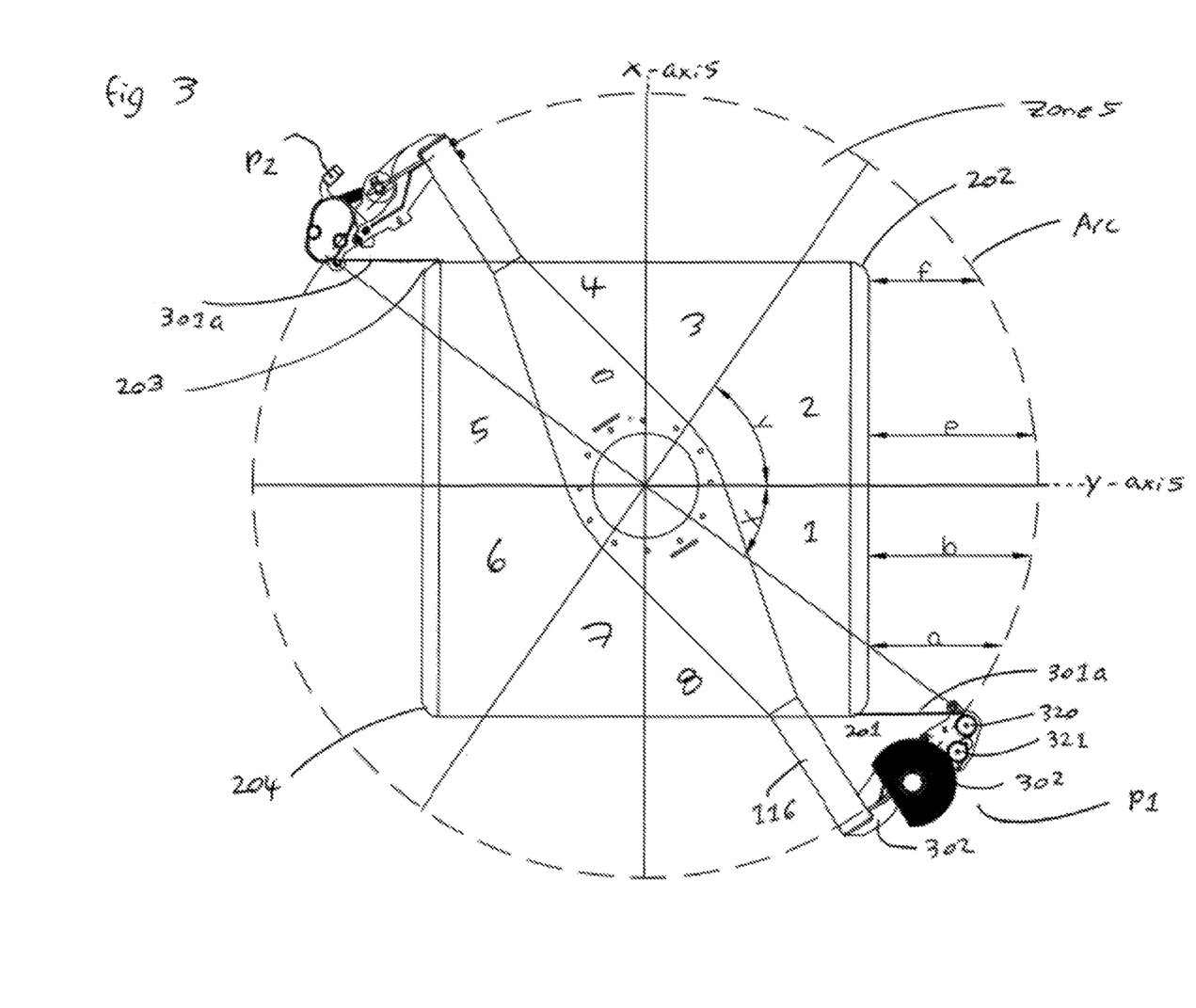
FIG. 3 a schematic representation of acceleration and decelerations zones of a typical cylindrical bale of material.

FIG. 3 outlines and illustrates the path of rotation of the dispenser means and the acceleration and deceleration zones around a non-uniform bale of material. This is one such example of the geometry of a non-uniformed shaped bale of material. There are many different geometrical layouts that it will cater for dispensing wrapping material at a consistent prestretch ratio. The following zones may be provided:

Zone 1—acceleration zone
Zone 2—deceleration zone
Zone 3—acceleration zone
Zone 4—deceleration zone
Zone 5—acceleration zone
Zone 6—deceleration zone
Zone 7—acceleration zone
Zone 8—deceleration zone The angle of zone 1, denoted by the letter X outlines the start and end of the acceleration zone. The angle of zone 2, denoted by letter Y outlines the start and end of the deceleration zone. In this embodiment the acceleration and deceleration zones alternate in sequence: Zones 1, 3, 5, 7—outline the acceleration zones; and Zones 2, 4, 6, 8—outline the deceleration zones.

The position P1 and position P2 on a typical double dispenser machine is the start of acceleration zone 1 and acceleration zone 5. Note the same methods may be applied to multiple dispenser wrapping devices. The acceleration zone around the bale 200 of material can be characterised by dimensions a and b in FIG. 3. As the sheet of wrapping material 301 a makes contact with the corner of the bale of material 201, and 203, the arc of the dispenser means rotational support 116 will move in a general outward direction away from the side of the bale of material. As a result, the dimension from the side of the bale 200 of material to the dispenser means roller 325, 326 or arc will increase leading to the wrapping material experiencing an acceleration of speed at which its being pull from the dispenser means. This can be clearly denoted by dimension a and b, value of b>a. The acceleration zone in this example can be further defined by the arc following a plus value on both the x and y axis. The dispenser means moves along a positive value both on the x and y axis.

The deceleration zone around the bale of crop material can be characterised by dimensions e and f in FIG. 3. As the sheet of wrapping material 301 a makes contact with the corner of the bale of material 202 and 204, the arc of the dispenser means rotational support 116 will move in a general inward direction closer to the side of the bale of material and as a result the dimension from the side of the bale of material to the dispenser means roller 325, 326 or arc will decrease leading to the wrapping material experiencing a deceleration of speed at which its being pull from the dispenser means. This can be denoted by dimension e and f, f value<e. The deceleration zone can be further defined by the arc following a negative value on the y axis while the value on the x axis continues in a positive direction.

In general, within the acceleration zones, the arc of rotation, the dimension will increase from the side of the bale of material until the maximum is reached. The deceleration zones the arc of rotation, the dimension will decrease from the side of the bale of material until the minimum of a zero value is reached and cycle begins again.

Generally, the acceleration zones involve the dispenser means rotating on an arc moving in a general direction away from the last corner of the bale of material that the wrapping material has made contact with.

Generally, the deceleration zones involve the dispenser means rotating on an arc moving in a general direction in towards the next corner of the bale of material that the wrapping material will make contact with.

Figure 4:
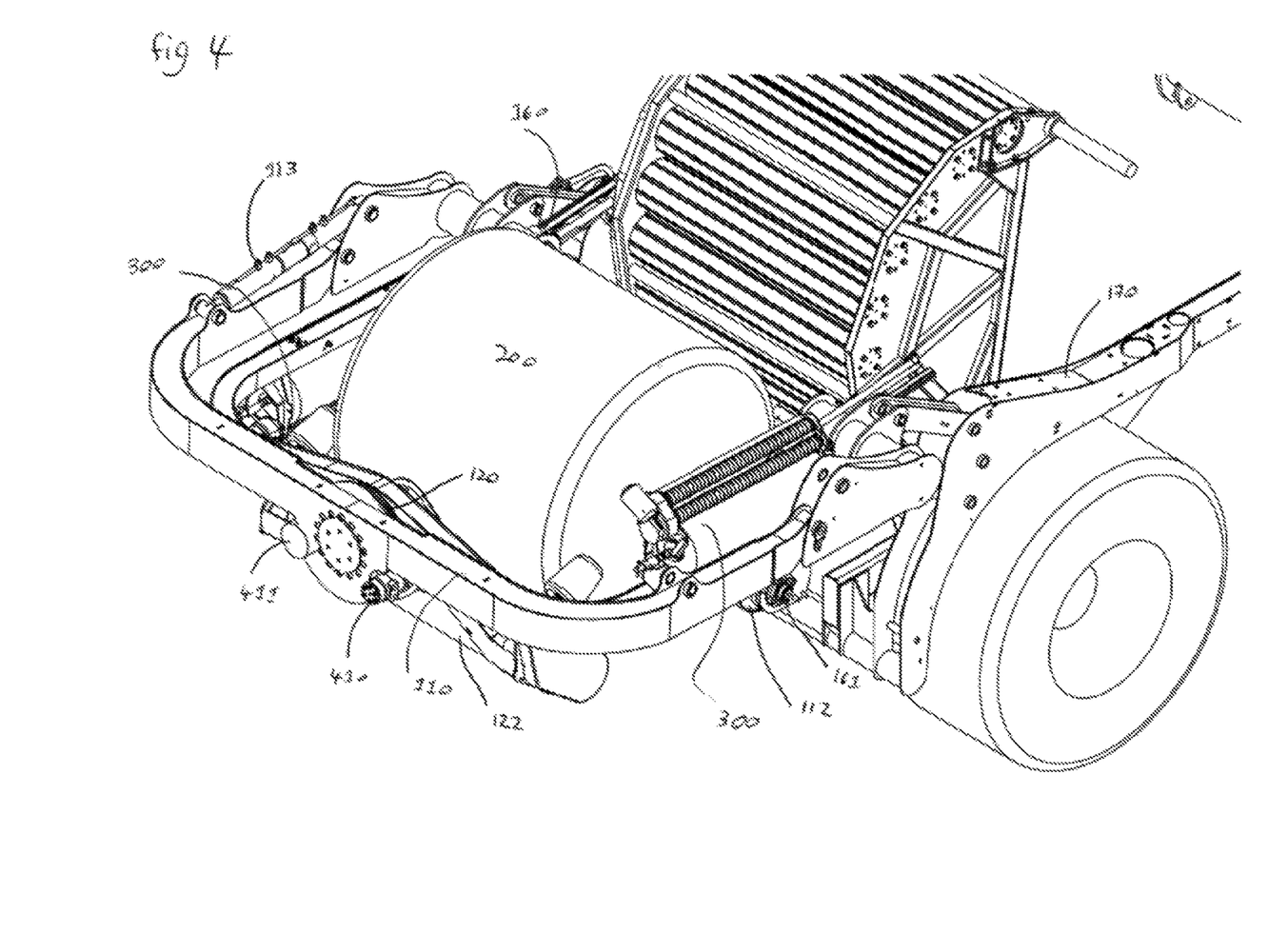
FIG. 4 a 3D-view of the wrapping device.

FIG. 4 shows a 3D view of the wrapping apparatus with the bale 200 positioned within the wrapping apparatus. Components are labelled as per previous figures.

The features disclosed in this specification, the figures and/or the claims may be material for the realization of various embodiments, taken in isolation or in various combinations thereof.

The invention claimed is:

1. A bale wrapping apparatus comprising:
a wrapping table including:
a bale rotating device (112, 122) configured to support and rotate a bale made from a crop product for the application of a wrapping material;
a material dispenser (325, 326) configured to dispense the wrapping material; and
a material dispenser rotational support (116) configured to rotate the wrapping material dispensed around a central rotating axis; and
a wrapping control system, comprising:
a first sensor component (500) configured to sense first signals indicating rotational position and rotational speed for the material dispenser rotational support (116);
a second sensor component (512) configured to sense second signals indicating rotational speed for the material dispenser (325, 326);
a third sensor component (502) configured to sense third signals indicating an ejection of the bale from a bailing apparatus onto the wrapping table; and
a controller configured to:
receive the first signals, the second signals, and the third signals;
generate first control signals in response to processing the first signals, the second signals, and the third signals; and
provide the first control signals to at least one of:
the material dispenser (325, 326) for controlling a dispensing rate of the wrapping material and
the material dispenser rotational support (116) for controlling rotation of the material dispenser rotational support (116).

2. The bale wrapping apparatus according toclaim 1 wherein the material dispenser comprises material dispenser rollers (325, 326) configured to dispense the wrapping material.

3. The bale wrapping apparatus according toclaim 2 wherein:
the material dispenser rollers (325, 326) are connected to a dispenser rollers drive (310) having a gear (320, 321); and
the gear (320, 321) is configured, in response to the first control signals, to provide a geared ratio of rotational speed for rollers (325, 326) of the material dispenser rollers to the dispenser rollers drive (310).

4. The bale wrapping apparatus according to claim 1 wherein:
the bale rotating device comprises a plurality of bale rotating rollers (112, 122);
the wrapping control system further comprises a fourth sensor component (525) configured to sense fourth signals indicating rotational speed of the plurality of bale rotating rollers (112, 122); and
the controller is further configured to:
receive the fourth signals;
generate second control signals in response to processing at least oneof the first signals, the second signals, the third signals, and the fourth signals; and
provide the second control signals, for controlling rotation of the pluralityof bale rotating rollers (112, 122), to the bale rotating device (112, 122).

5. The bale wrapping apparatus according to claim 4 wherein the wrapping control system further comprises a fifth sensor component (503) configured to sense fifth signals indicating an end and a start of a360 degree path of rotation of the material dispenser rotational support (116).

6. The bale wrapping apparatus according to claim 5 wherein the controller is further configured to implement, in response to processing at least one of the first signals, the second signals, the fourth signals, and the fifth signals, a first mode of operation in an acceleration zone and a second mode of operation in a deceleration zone around the 360 degree path of rotation of the material dispenser rotational support (116), at least one of the first control signals and the second control signals being different for the acceleration zone and the deceleration zone.

7. A method for wrapping a bale made from a cropproduct by a bale wrapping apparatus, the method comprising:
receiving a bale of crop on a wrapping table from a bailing apparatus;
supporting and rotating the bale by a bale rotating device (112, 122) for applying a wrapping material to the bale;
dispensing the wrapping material by a material dispenser (325, 326);

rotating the wrapping material dispensed around a central rotating axis by a material dispenser rotational support (116); and controlling the wrapping of the wrapping material by a wrapping control system, the controlling comprising:

sensing, by a first sensor component (500), first signals indicating rotational position and rotational speed for the material dispenser rotational support(116);

sensing, by a second sensor component (512), second signals indicating rotational speed for the material dispenser (325, 326);

sensing, by a third sensor component (502), third signals indicating an ejection of the bale from the bailing apparatus onto the wrapping table; and operating a controller, comprising:
  receiving the first signals, the second signals, and the third signals;
generating first control signals in response to processing the first signals, the second signals, and the third signals; and
  providing the first control signals to at least one of the material dispenser(325, 326) for controlling a dispensing rate of the wrapping material, and the material dispenser rotational support (116) for controlling rotation of the material dispenser rotational support (116).

8. The method according to claim 7 further comprising:

wrapping a bale having a non-uniform shape;

controlling a stretch ratio for the dispensing of the wrapping material; and dispensing the wrapping material with a consistent stretch ratio.

* * * * *